3,646,095
ORGANIC DI-ISOCYANATES OF
ALKYLADAMANTANES
Robert E. Moore, Wilmington, Del., assignor to Sun Oil
Company, Philadelphia, Pa.
No Drawing. Continuation-in-part of application Ser. No. 587,948, Oct. 20, 1966. This application Dec. 18, 1968, Ser. No. 784,952
Int. Cl. C07c *19/04*
U.S. Cl. 260—453 AP 5 Claims

ABSTRACT OF THE DISCLOSURE

New compounds are disclosed which are 1,3 - diisocyanates of $C_{12}$–$C_{20}$ alkyladamantanes having 1–2 alkyl groups attached to the adamantane nucleus. They are particularly useful as monomers for preparing polyurethane resins.

CROSS REFERENCE TO RELATED APPLICATIONS

This application is a continuation-in-part of my copending application Ser. No. 587,948, filed Oct. 20, 1966, now abandoned.

This invention relates to 1,3-diisocyanates of $C_{21}$–$C_{20}$ alkyladamantanes having 1–2 alkyl groups attached to the adamantane nucleus. These products are particularly useful as monomers for the preparation of polyurethane resins.

The adamantane nucleus has ten carbon atoms, four of which are bridgehead carbons that are equivalent to each other, as can be seen from the following typographical representation:

As shown, the bridgehead carbon atoms customarily are designated by the numerals 1, 3, 5 and 7 respectively.

The preparation of methyl- and/or ethyl-substituted adamantanes by the isomerization of tricyclic naphthenes by means of an aluminum halide or HF—$BF_3$ catalyst has been described in several references including the following: Schneider, U.S. Pat. No. 3,128,316, dated Apr. 7, 1964; Janoski and Moore, U.S. Pat. No. 3,275,700, dated Sept. 27, 1966; Schneider et al. U. S. Pat. Nos. 3,336,405 and 3,336,406, dated Aug. 15, 1967; Schleyer et al., Tetrahedron Letters No. 9, pp. 305–309 (1961); and Schneider et al., JACS, vol. 86, pps. 5365–5367 (1964). The isomerization products can have the methyl and/or ethyl groups attached to the adamantane nucleus at either bridgehead or nonbridgehead positions or both, although completion of the isomerization reaction favors bridge-head substitution. Examples of alkyladamantanes made by such isomerization are dimethyladamantanes, ethyladamantanes and methylethyladamantanes.

Preparations of adamantane hydrocarbons having higher alkyl substituents have been described in the following references: Schneider U.S. Pat. No. 3,382,228, dated May 7, 1968; Spengler et al., Erdöl und Kohle-Erdgas-Petrochemie, vol. 15, pp. 702–707 (1962); and Hoek et al., 85, (1966), Recueil, 1045–1053. Examples of alkyladamantanes that can be made by procedures disclosed in these references are propyladamantane, butyladamantanes, hexyladamantane, decyladamantane, diethyladamantanes, methylbutyladamantanes; ethylpentyladamantanes and propylheptyladamantane.

The diisocyanates of the present invention have the isocyanato groups attached to the adamantane nucleus at bridgehead positions and, in other words, are 1,3-diisocyanates. The hydrocarbon moiety can correspond to any alkyladamantane having 1–2 alkyl groups and 12–20 total carbon atoms (2–10 alkyl carbon atoms). The alkyl group or groups can be attached to the adamantane nucleus at either bridgehead or nonbridgehed positions or both.

Examples of products according to the invention are the 1,3-diisocyanate derivatives of the following hydrocarbons: 1 - ethyl or 2 - ethyladamantane; 1,2 - dimethyl, 1,3 - dimethyl or 1,4 - dimethyladamantane; 1 - methyl-3-ethyladamantane; methylethyladamantanes in which at least one of the alkyl substituents is nonbridgehead; 1,3-diethyladamantane; 1-n-propyl or 1-isopropyladamantane; 1 - n-butyladamantane; 1,3 - di-n-pentyladamantane; 1-heptyl - 4 - methyladamantane; 1 - n-decyladamantane; 1 - n-octyl - 3 - ethyladamantane; 1 - propyl - 2-methyladamantane and the like.

Preferred products of the invention are the 1,3-diisocyanato-5,7-dialkyladamantanes and particularly those in which the alkyl groups are methyl and/or ethyl. Since these compounds have substituents at all four bridgehead positions of the nucleus they contain no tertiary hydrogen atoms and are less susceptible to oxidation than 1,3-diisocyanato adamantane compounds in which at least one of the other bridgehead positions is unsubstituted. Especially preferred diisocyanates which have substitutes at all bridgehead positions are 1,3 - diisocyanato-5,7-dimethyladamantane and 1,3 - diisocyanato-5-methyl-7-ethyladamantane. The parent hydrocarbons corresponding to these compounds can readily be obtained by processes described in U. S. Pat. Nos. 3,128,316 and 3,275,700.

The 1,3-diisocyanates of the present invention are colorless and odorless and are usually liquid at room temperature. This is in contrast to adamantane - 1,3-diisocyanate which is a high melting solid. The product corresponding to bridgehead dimethyladamantane, namely, 1,3 - diisocyanato - 5,7 - dimethyladamantane, has a melting point of about 26° C. as measured by differential thermal analysis. However it has a high tendency to supercool so that it usually will remain liquid at temperatures substantially below this value. The presence of one or more higher alkyl substituents tends to reduce melting point of the product, as also does nonbridgehead substitution of alkyl groups on the adamantane nucleus. Also in contrast to aromatic and aliphatic diisocyanates of the prior art which are generally odoriferous and lacrimatory, the present products are substantially odor-free and non-lacrimatory.

The diisocyanate products of the invention have particular utility in the preparation of polyurethane resins of either the foamed or unfoamed type, as described and claimed in Moore and Driscoll application Ser. No. 639,-309, filed May 18, 1967, which is a continuation-in-part of an earlier application Ser. No. 525,290, filed Feb. 7, 1966 and abandoned May 28, 1967. For this purpose the 1,3-diisocyanates are reacted in the presence of a catalyst with polyols of molecular weight in the range of 400 to 10,000, utilizing conventional techniques for producing polyurethane resins. Suitable types of polyols include polyesters, polyethers and polyether glycols, such as polyoxyalkylene glycols, sorbitol polyethers, castor oil, polypropylene glycol, hydrogenated castor oil and the like. Polyurethane resins made from the subject diisocyanates have distinct advantages over conventional polyurethane resins made from aromatic and aliphatic diisocyanates. They possess the light stability characteristics of polyurethanes produced from aliphatic diisocyanates, the heat stability properties of those from aromatic diisocyanates and, in addition, have greater resistance to degradation by water than either type of prior polyurethanes. Polyurethane resins made from the present diisocyanates are initially colorless and are substantially non-yellowing when exposed to sunlight.

The 1,3-diisocyanates of this invention are relatively unreactive as compared to aromatic and aliphatic diisocyanates of the prior art, and this characteristic provides certain processing advantages in their utilization for polyurethane resin manufacture. The low reactivity with water allows the present products to be handled and shipped without necessity for exercising special precautions to prevent contact with air and moisture. Also the present products, unlike the prior art diisocyanates, will not react with hydroxy compounds, such as alcohols, glycols and other polyols, in the absence of a catalyst. This inertness allows the present diisocyanates to be supplied in the form of an appropriate mixture with the polyol to be reacted, and the mixture can thereafter be made to react by addition of a suitable catalyst such as dibutyl tin dilaurate. Supply of reagents and control of the reaction can thus be simplified, as compared with the situation with prior art diisocyanates which usually readily react with polyols upon contact without a catalyst.

A distinct processing advantage also is provided by the present 1,3-diisocyanates as compared to adamantane-1,3-diisocyanate. This is due to the fact, as mentioned above, that the latter is a high melting solid, whereas the 1,3-diisocyanates of $C_{12}$–$C_{20}$ alkyladamantanes normally are liquid at ordinary temperatures. Hence the present products can be handled more readily, e.g., by pumping and metering, and can be blended more easily with the polyols with which they are to be reacted.

Products of the invention are made from the corresponding 1,3-diamino compounds of $C_{12}$–$C_{20}$ alkyladamantanes. These intermediate 1,3-diamino compounds can be derived from the corresponding $C_{12}$–$C_{20}$ alkyladamantane hydrocarbons in several ways. One way is to react the hydrocarbon with nitrogen dioxide in the manner described in Schneider U.S. Pat. No. 3,258,498, dated June 28, 1966, separate from the reaction product the 1,3-dinitro derivative (e.g., by distillation), and then reduce the latter by hydrogenation in the presence of Raney nickel in the manner described by Smith et al., J. Org. Chem., 26, pps. 2207–2212 (1961).

Another manner of preparing the 1,3-diamino alkyladamantanes is to convert the hydrocarbon first to dibromo or dichloro alkyladamantanes, then react the dihaloalkyladamantane with hydrogen cyanide in the presence of fuming sulfuric acid and hydrolyze the mixture to form a 1,3-diformamido alkyladamantane, as described in my copending application Ser. No. 721,585, filed Apr. 16, 1968. Alternatively, the 1,3-diformamido derivative can be prepared from dihydroxy alkyladamantanes by an analogous reaction, as described in Schneider and Moore application Ser. No. 725,573, filed Apr. 16, 1968. After the 1,3-diformamido intermediate has been obtained, it can be heated in the presence of an aqueous mineral acid (e.g., 40% $H_2SO_4$) to cause the 1,3-diformamido compound to hydrolyze to the corresponding 1,3-diamino derivative. The latter procedure is described in my U.S. Pat. No. 3,419,611, dated Dec. 31, 1968.

When dibromo or dichloro alkyladamantanes are to be used as intermediates for preparing products of the invention as above-described, these dihalo compounds can be made from the corresponding hydrocarbons by procedures analogous to those described in the following references: Stetter et al. German Pat. No. 1101,410; Stetter, Angew. Chem., internat. Edit., Vol. 1 (1962) No. 6, pps. 287–288; and Smith et al., J. Org. Chem., 26, pps. 2207–8 (1961). On the other hand, when dihydroxy alkyladamantanes are to be used as the intermediates, they can be prepared by catalytically oxidizing the hydrocarbon with air in the manner described in Schneider U.S. Pat. No. 3,356,741, dated Sept. 5, 1967 or by reacting the hydrocarbon with chromic acid in the manner taught in Moore U.S. Pat. No. 3,383,424, dated May 14, 1968.

Preparation of the compounds of the invention can be carried out by converting the corresponding 1,3-diaminoalkyladamantane compound or its hydrochloride salt into the 1,3-diisocyanate by means of phosgene. The overall reaction may be depicted by the following equation, utilizing for purpose of illustration the hydrochloride salt of the diamino compound in which the hydrocarbon moiety corresponds to bridgehead dimethyladamantane:

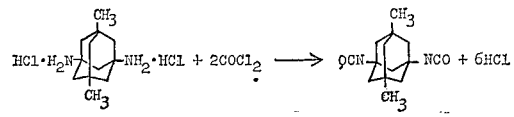

This type of reaction for making diisocyanates is well known and is described, for example, in Bulletin HR–2, Jan. 20, 1956, of Du Pont Elastomer Chemicals Department and references cited therein.

The following is a preferred procedure for carrying out the phosgenation reaction. A slurry of one part of the diamino-hydrochloride alkyladamantane compound in 5–10 parts by weight of o-dichlorobenzene is prepared in a reactor provided with a reflux condenser. The mixture is heated to reflux temperature (185–190° C.) and phosgene is sparged into the boiling mixture. Foaming tends to occur due to release of gaseous HCl, so that it is best to have the reactor only partially filled. Addition of phosgene is preferably continued until the mixture becomes a clear solution, which indicates that all of the diamino compound has undergone phosgenation to form diisocyanate which is soluble in the mixture. After the reaction has been completed, the o-dichlorobenzene is removed by evaporation at reduced pressure (e.g., 20 mm. Hg absolute) and the diisocyanate is then distilled off under full vacuum (e.g., 1 mm. Hg absolute). The distillate product generally will be obtained as a colorless liquid. Yields of the 1,3-diisocyanate product usually are better than 90% based on theoretical.

The following example specifically illustrates preparation of novel 1,3-diisocyanate product of the invention, the product in this instance corresponding to the parent hydrocarbon 1,3-dimethyladamantane:

EXAMPLE

A slurry consisting of 400 ml. of o-dichlorobenzene and 25 g. of 1,3-diamino-5,7-dimethyladamantane was heated to boiling temperature (about 185–190° C.) and a stream of phosgene gas was fed into the mixture. Refluxing of the mixture and addition of phosgene was continued for 6 hours, at which time only a small amount (<1 g.) of the diamino compound remained suspended in the liquid. The mixture was then filtered to remove the solid and the o-dichlorobenzene was distilled off at 20 mm. Hg absolute. The crude product was then distilled at 0.5 mm. Hg absolute (measured at the vacuum pump) and 21.0 g. of product passed over-head at about 100° C. and was collected. Elemental analysis and IR and NMR spectra showed that this product was substantially pure 1,3-diisocyanato-5,7-dimethyladamantane. The yield based on theoretical was 91%. This product had a refractive index ($\eta_D^{20}$) of 1.5001 and as collected was a colorless and odorless liquid. Although it remained liquid upon prolonged standing at ordinary room temperature, differential thermal analysis showed that it had a melting point of 26° C. This product did not exhibit any reaction with hot water or boiling alcohol in the absence of catalyst.

The 1,3-diisocyanate prepared as described above was used to make a polyurethane foam. This was done by stirring 0.65 g. of it with 1.0 g. of a commercial polyether triol of alkylene oxide (mol. wt.=2700–3300), one drop of a dimethyl silicone fluid and 0.15 ml. of water, adding a trace of dibutyl tin dichloride and then stopping the stirring. A white, dense, closed cell foam was produced. For purpose of comparison, another foam was prepared in substantially the same way but using 0.43 g. of tolylyl diisocyanate in place of the dimethyladamantane derivative.

When the polyurethane foam made from the aromatic diisocyanate was exposed to sunlight for 3 days, it showed some discoloration; and after 5 months exposure the foam was brown in color. In contrast, the foam made from the 1,3-diisocyanato-5,7-dimethyladamantane when exposed to sunlight for 5 months exhibited no discoloration whatever.

The 1,3-diisocyanates of other alkyladamantanes as herein specified can be prepared in the same manner as above described for the dimethyladamantane derivative and they likewise will have polyurethane foams that exhibit far better stabilities on exposure to sunlight than the polyurethanes made from aromatic diisocyanates.

The invention can also be practiced employing a mixture of the 1,3-diisocyanates with various arrangements of alkyl substitution on the adamantane nucleus. For example, a mixture of $C_{12}$ alkyladamantane isomers can be prepared from perhydroacenaphthene by the isomerization process described in Janoski and Moore United States Pat. No. 3,275,700, the mixture including both bridgehead and nonbridgehead ethyladamantanes and various dimethyladamantane isomers; and this mixture can then be converted to mixed 1,3-diisocyanates by procedures as described above. An advantage in utilizing such a mixture of products is that it will have no tendency to solidify even when allowed to stand under cold weather conditions.

The invention claimed is:
1. A 1,3-diisocyanate of alkyladamantane in which the alkyladamantane moiety has 12–20 total carbon atoms and 1–2 alkyl groups.
2. A 1,3-diisocyanate of alkyladamantane according to claim 1 wherein said alkyl groups are selected from methyl and ethyl.
3. A 1,3-diisocyanate according to claim 1 in which the alkyladamantane moiety corresponds to 5,7-dialkyladamantane.
4. A 1,3-diisocyanate according to claim 3 wherein each of the alkyl groups is methyl.
5. A 1,3-diisocyanate according to claim 3 wherein one of the alkyl groups is methyl and the other ethyl. ,

References Cited
UNITED STATES PATENTS

| | | | |
|---|---|---|---|
| 3,258,498 | 6/1966 | Schneider | 260—563 X |
| 3,301,827 | 1/1967 | Martin | 260—78 |
| 3,419,611 | 12/1968 | Moore | 260—563 |

ALEX MAZEL, Primary Examiner

D. H. TORRENCE, Assistant Examiner

U.S. Cl. X.R.

260—2.5 AT, 75 NT, 77.5 AT, 464, 563 P, 561 R, 617 R, 644, 648 R, 666 M